US006892530B2

(12) United States Patent
Montreuil et al.

(10) Patent No.: US 6,892,530 B2
(45) Date of Patent: May 17, 2005

(54) EXHAUST GAS AFTERTREATMENT SYSTEMS (75) Inventors: Clifford Norman Montreuil, Livonia, MI (US); Michiel J. van Nieuwstadt, Ann Arbor, MI (US); Paul J. Tennison, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 10/301,445

(22) Filed: Nov. 21, 2002

(65) Prior Publication Data

US 2004/0098980 A1 May 27, 2004

(51) Int. Cl.[7] .................................................. F01N 3/00
(52) U.S. Cl. .......................... 60/295; 60/274; 60/276; 60/277; 60/286; 60/295; 60/297; 60/301
(58) Field of Search ....................... 60/274, 276, 277, 60/285, 286, 295, 297, 303, 311

(56) References Cited

U.S. PATENT DOCUMENTS

| | | | | |
|---|---|---|---|---|
| 5,628,186 A | * | 5/1997 | Schmelz ...................... | 60/286 |
| 5,643,536 A | * | 7/1997 | Schmelz ...................... | 60/286 |
| 5,665,318 A | | 9/1997 | Rembold et al. | |
| 5,771,689 A | | 6/1998 | Bareis et al. | |
| 5,809,775 A | | 9/1998 | Tarabulski et al. | |
| 5,893,267 A | | 4/1999 | Vogtlin et al. | |
| 5,924,280 A | | 7/1999 | Tarabulski | |
| 6,003,305 A | | 12/1999 | Martin et al. | |
| 6,038,854 A | | 3/2000 | Penetrante et al. | |
| 6,066,303 A | | 5/2000 | Sudduth et al. | |
| 6,109,024 A | * | 8/2000 | Kinugasa et al. ............ | 60/286 |
| 6,119,452 A | * | 9/2000 | Kinugasa et al. ............ | 60/295 |
| 6,125,629 A | | 10/2000 | Patchett | |
| 6,171,566 B1 | | 1/2001 | Ku et al. | |
| 6,182,443 B1 | | 2/2001 | Jarvis et al. | |
| 6,192,675 B1 | | 2/2001 | Hirota et al. | |
| 6,209,315 B1 | | 4/2001 | Weigl | |
| 6,221,324 B1 | | 4/2001 | Coq et al. | |
| 6,266,955 B1 | | 7/2001 | Liang et al. | |
| 6,269,633 B1 | | 8/2001 | Van Nieuwstadt et al. | |
| 6,294,141 B1 | | 9/2001 | Twigg et al. | |
| 6,299,847 B1 | | 10/2001 | Allen | |
| 6,305,160 B1 | | 10/2001 | Hammerle et al. | |
| 6,311,480 B1 | | 11/2001 | Suzuki et al. | |
| 6,314,722 B1 | | 11/2001 | Matros et al. | |
| 6,383,463 B1 | | 5/2002 | Mochida et al. | |
| 2002/0104312 A1 | * | 8/2002 | Hoffman et al. ............... | 60/295 |

FOREIGN PATENT DOCUMENTS

WO WO 99/39809 8/1999

OTHER PUBLICATIONS

IMECE–2002–DSC–32104, "Modeling of a Urea SCR Catalyst with Automotive Applications", Devesh Upadhyay, Michiel Van Nieuwstadt, pp. 1–7, Proceedings of ASME: IMECE, Nov. 17, 2002, New Orleans.
IMECE–2002–DSC–32103, "Control Design of an Automotive Urea SCR Catalyst", Devesh Upadhyay, Michiel Van Nieuwstadt, pp. 1–8, Proceedings of ASME:IMECE, Nov. 17, 2002, New Orleans.

* cited by examiner

*Primary Examiner*—Tu M. Nguyen
(74) *Attorney, Agent, or Firm*—Allan J. Lippa; Alleman Hall McCoy Russell & Tuttle LLP (57) ABSTRACT A method for improving NOx conversion efficiency of a urea base SCR catalyst is presented. Since efficiency is reduced by the presence of hydrocarbons in the catalyst, the method proposes to regenerate the SCR by maintaining its temperature above the boiling point of hydrocarbons for a sufficient period of time to free up catalyst storage sites. The regeneration process is followed by over-injection of ammonia to replenish the ammonia released from the SCR catalyst due to high regeneration temperatures.

18 Claims, 7 Drawing Sheets

EXHAUST GAS AFTERTREATMENT SYSTEMS

FIELD OF INVENTION

The present invention relates to a system and a method for improving performance of a lean exhaust gas aftertreatment system, and more particularly to regenerating a urea based selective catalytic Reduction (SCR) catalyst to improve its NOx conversion efficiency.

BACKGROUND OF THE INVENTION

Current emission control regulations necessitate the use of catalysts in the exhaust systems of automotive vehicles in order to convert carbon monoxide (CO), hydrocarbons (HC), and nitrogen oxides (NOx) produced during engine operation into harmless exhaust gasses. Vehicles equipped with diesel or lean gasoline engines offer the benefit of increased fuel economy. Such vehicles have to be equipped with lean exhaust aftertreatment devices, such as, for example, a urea based Selective Catalytic Reduction (SCR) catalyst, in which NOx is continuously removed through active injection of a reductant, such as urea, into the exhaust gas mixture entering the catalyst. A typical lean exhaust gas aftertreatment system may also include an oxidation catalyst which is coupled upstream of the SCR catalyst to convert hydrocarbons and carbon monoxide in the exhaust gas mixture. The inventors herein have recognized that one way to achieve fast SCR catalyst warm-up and thus improve its NOx conversion efficiency is to increase the hydrocarbon concentration in the exhaust gas mixture entering the oxidation catalyst, which may be accomplished by either external hydrocarbon (fuel) injection or by adjusting engine-operating conditions, such as injection timing. The extra hydrocarbons will burn in the oxidation catalyst and the heat so generated will warm up of the SCR catalyst.

The inventors herein have further recognized that in such a system, soot and unreduced hydrocarbons from the oxidation catalyst may adsorb on the surface of the SCR catalyst, thus contaminating the SCR catalyst and reducing its NOx conversion efficiency. The inventors have also recognized that maintaining it at a temperature above the boiling point of hydrocarbons, or the regeneration temperature of soot, for a predetermined amount of time, can regenerate the SCR catalyst. Additionally, the inventors have recognized that NOx conversion in the SCR catalyst is improved in the presence of stored ammonia. Therefore, since the regeneration process causes some of the ammonia stored in the SCR catalyst to be released, NOx conversion efficiency of the SCR catalyst following regeneration will be less than optimal.

As will be described below, a method for regeneration of an SCR catalyst is disclosed which removes soot and hydrocarbon contamination while maintaining ammonia storage in the catalyst required for optimal NOx conversion efficiency.

SUMMARY OF THE INVENTION

In accordance with the present invention, a method is provided for controlling a lean exhaust gas aftertreatment device for an internal combustion engine. The method is used to regenerate the device when its NOx conversion efficiency is degraded. This is accomplished by maintaining the device temperature above a predetermined temperature for a sufficient time to dispose of stored contaminants. In addition, increasing an amount of reductant injected following regeneration to allow reductant storage in the device further improves its NOx conversion efficiency.

In accordance with one embodiment, a method for regenerating an SCR catalyst coupled downstream of an internal combustion engine, includes: providing an indication that the SCR catalyst should be regenerated to remove contaminants; in response to said indication, regenerating the SCR catalyst by operating it above a predetermined temperature for a predetermined interval. In accordance with another aspect of the present invention, a method for controlling an exhaust gas aftertreatment device coupled downstream of a lean burning internal combustion engine, includes: a first mode of operation wherein the device is operated at a temperature above a first temperature for a predetermined interval to regenerate the device; and a second mode of operation wherein the device is operated at a temperature below said first temperature and reductant is added to an exhaust gas mixture entering the device to compensate for reductant released from the device during said regeneration.

In accordance with another embodiment, a method for controlling a lean exhaust gas aftertreatment system for an internal combustion engine, the system including at least a first device and a second device coupled downstream of the first device, includes: providing an indication that the second device is degraded; in response to said indication, introducing a first substance into the first device such that an exothermic reaction resulting from said introduction will maintain a temperature of the second device above a predetermined value for a predetermined amount of time; and introducing a second substance into the second device causing a portion of said second substance to be stored in said second device. In accordance with one embodiment, the first device is an oxidation catalyst, the first substance is hydrocarbon, the second device is an SCR catalyst, and the second substance is ammonia. Thus, with such an arrangement, when the SCR catalyst performance is degraded due to hydrocarbon contamination, an extra amount of hydrocarbons is injected into the oxidation catalyst to raise the temperature of the SCR above the boiling point of hydrocarbons, thus causing them to desorb. Alternatively, the SCR catalyst temperature may be raised above a temperature at which soot reacts with NOx or oxygen, thus removing both soot and hydrocarbons from the device. The regeneration process is followed by over-injection of ammonia into the SCR catalyst to compensate for ammonia released due to high regeneration temperature.

In another aspect of the present invention, a method for reducing an exhaust gas component of an exhaust gas mixture generated by an internal combustion engine in a mobile vehicle, includes: introducing an initial amount of reductant into an exhaust gas aftertreatment device receiving the exhaust gas mixture generated by the engine thereby reducing the exhaust gas component; decreasing said initial amount of reductant introduced into said exhaust gas aftertreatment device while regenerating the device; and increasing said initial amount of reductant introduced into said exhaust gas aftertreatment device for a predetermined interval following said regeneration thereby causing reductant to be stored in said exhaust gas aftertreatment device. In accordance with one embodiment, the device is an SCR catalyst, and the reductant is ammonia. Thus, with such an arrangement, an initial amount of ammonia will be introduced into the SCR catalyst during normal operation to facilitate continuous NOx conversion in the device. When the device is being regenerated, the initial ammonia amount will be reduced to account for regeneration. Following regeneration, an increased amount of reductant is be introduced into the catalyst to allow some ammonia to store in the device and thus improve its conversion efficiency. In one embodiment of this invention, ammonia injection is discontinued during regeneration.

The present invention provides a number of advantages. In particular, emission control is improved by regenerating the SCR catalyst when its NOx conversion efficiency is degraded to remove stored hydrocarbons and soot. SCR NOx conversion efficiency is further improved by replenishing ammonia storage in the catalyst following regeneration.

The above advantages and other advantages, and features of the present invention will be readily apparent from the following detailed description of the preferred embodiments when taken in connection with the accompanying drawings, and from the claims.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1A:
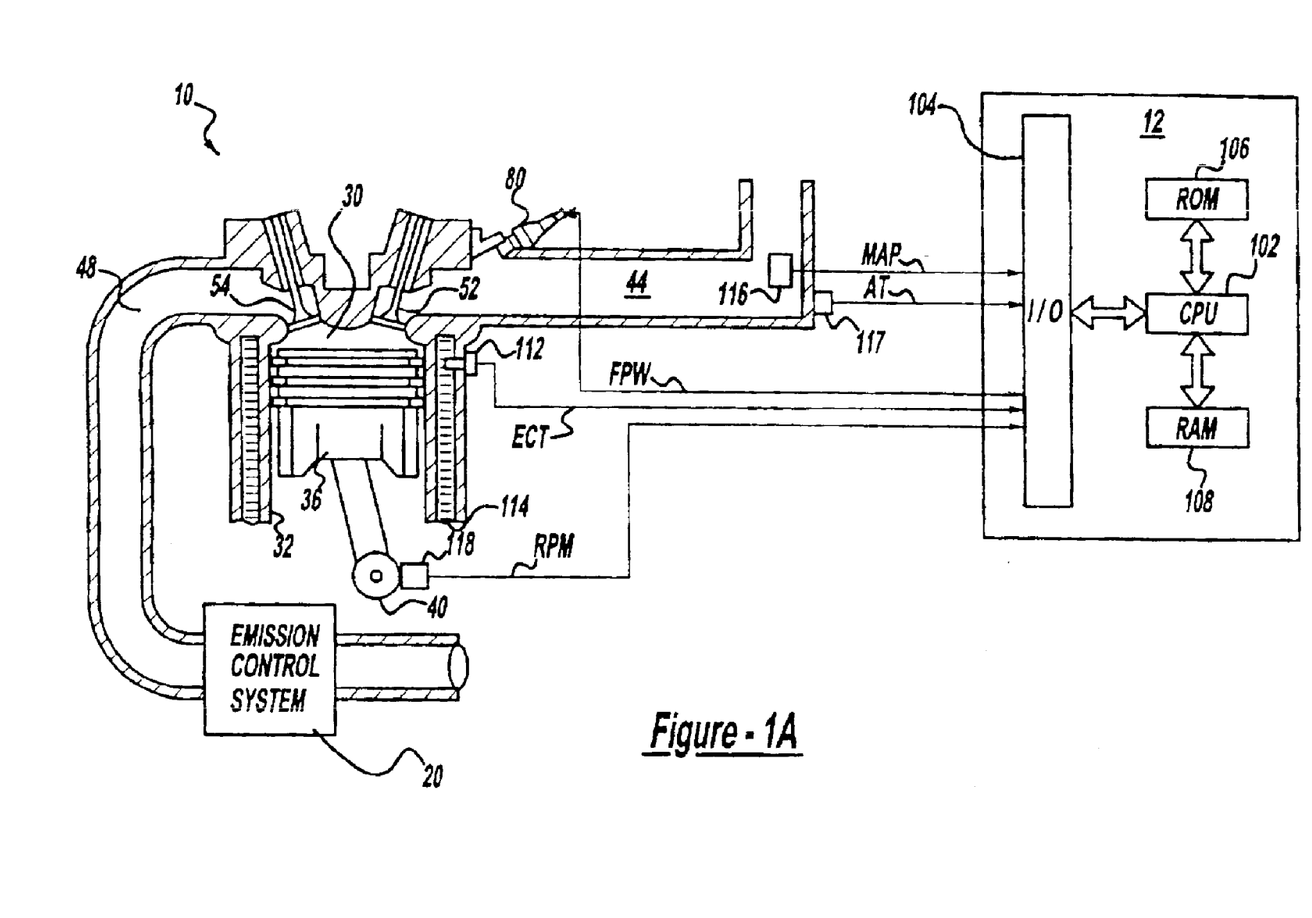
FIGS. 1A and 1B are schematic diagrams of an engine wherein the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system (not shown) including a fuel tank, fuel pump, and fuel rail (not shown).

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

Figure 2:
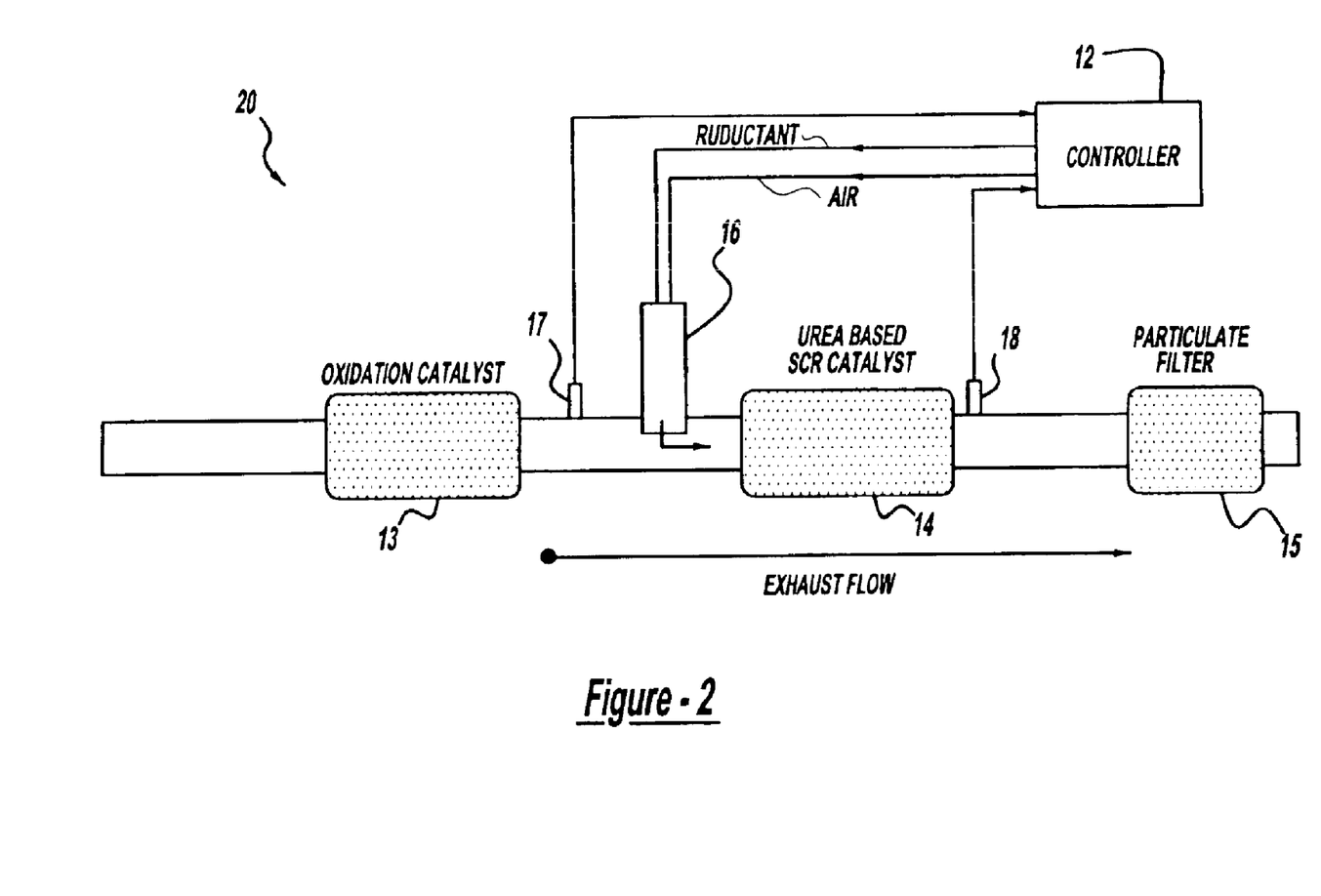
FIG. 2 is a an example of one embodiment of an emission control system wherein the present invention is used to advantage.

An emission control system 20 is coupled to an exhaust manifold 48 and is described with particular reference to FIG. 2.

Figure 1B:
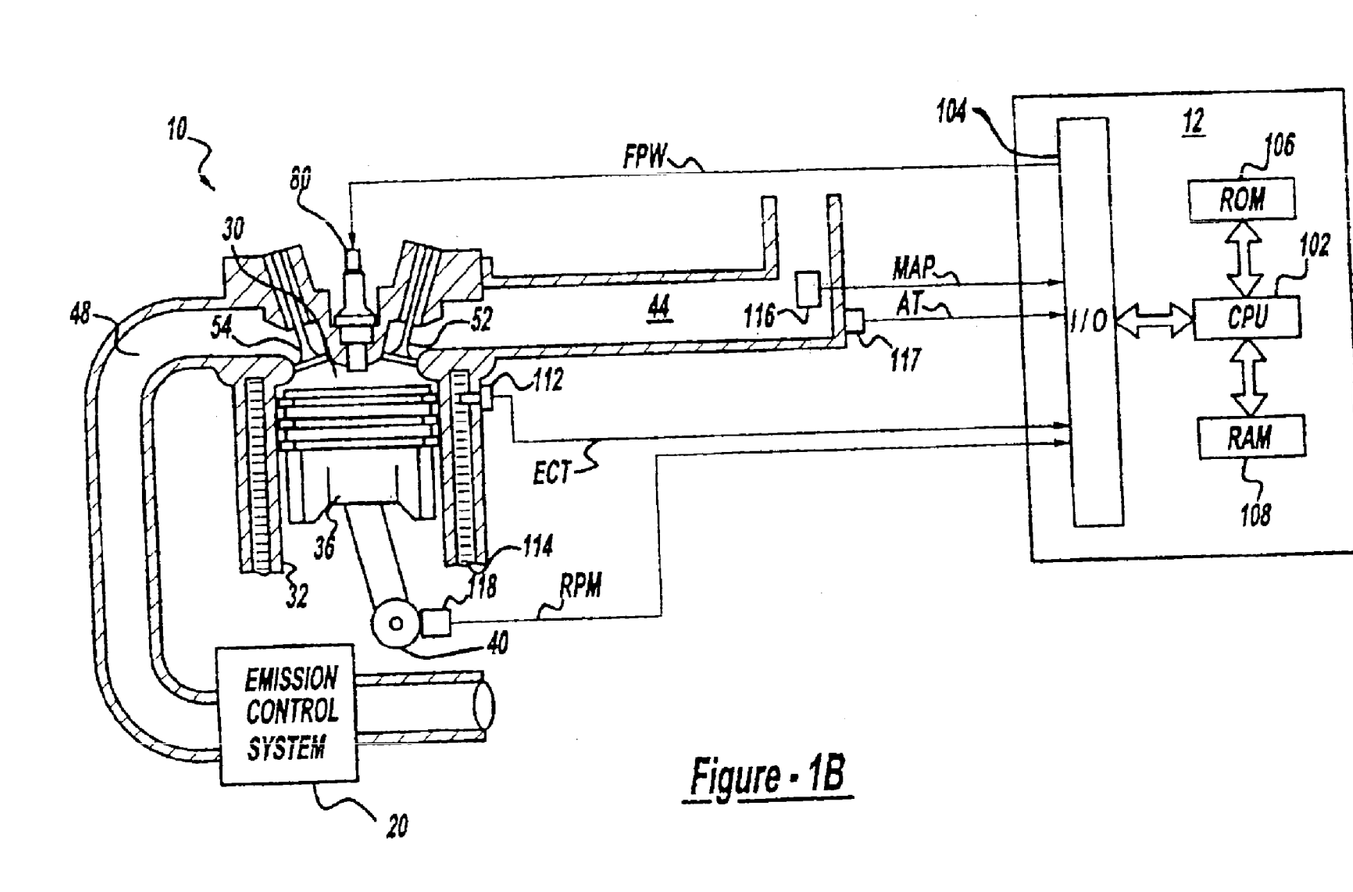

Referring now to FIG. 1B, an alternative embodiment is shown where engine 10 is a direct injection engine with injector 80 located to inject fuel directly into cylinder 30.

Referring now to FIG. 2, the emission control system 20 comprises a urea based Selective Catalytic Reduction (SCR) 14, which is capable of reducing NOx in an oxygen rich environment. Reductant, such as aqueous urea, is stored in a storage vessel (not shown) and delivered to a reductant delivery system 16 (described below with particular reference to FIGS. 3A–3C) coupled to exhaust manifold 48 upstream of SCR catalyst 14. The reductant is metered out by a pump through a control valve, where both the pump and the valve are controlled by controller 12. Alternatively, any other means known to those skilled in the art to supply reductant to an exhaust gas aftertreatment device may be used. Two NOx sensors, $NOx_1$ (17) upstream and $NOx_2$ (18) downstream of the SCR are coupled in the path of the exhaust gas entering and exiting the SCR catalyst. The outputs of these sensors are read by controller 12 and may be used to estimate the NOx conversion efficiency of the SCR. Alternatively, $NOx_1$ sensor 17 can be eliminated and the amount of NOx in the exhaust gas mixture entering the SCR catalyst can be estimated based on engine speed, load, exhaust gas temperature or any other parameter known to those skilled in the art to affect engine NOx production. Oxidation catalyst 13 is coupled upstream of the SCR catalyst and may be a precious metal catalyst, preferably one containing platinum. The oxidation catalyst exothermically combusts hydrocarbons (HC) in the incoming exhaust gas from the engine thus supplying heat to rapidly warm up the SCR catalyst 14. The temperature of the SCR catalyst may be raised by retarding injection timing, increasing EGR and intake throttling, or any other means known to those skilled in the art to increase the temperature of the exhaust gas. Alternatively, in a direct injection engine, extra hydrocarbons may be delivered to the oxidation catalyst for the SCR catalyst warm-up by in-cylinder injection during either or both of a power or exhaust stroke of the engine. In another alternative embodiment (not shown), a reductant delivery system such as, for example, the system described with particular reference to FIGS. 3a–3c may be used to increase the hydrocarbon concentration in the exhaust gas mixture entering the oxidation catalyst.

Figure 3A:
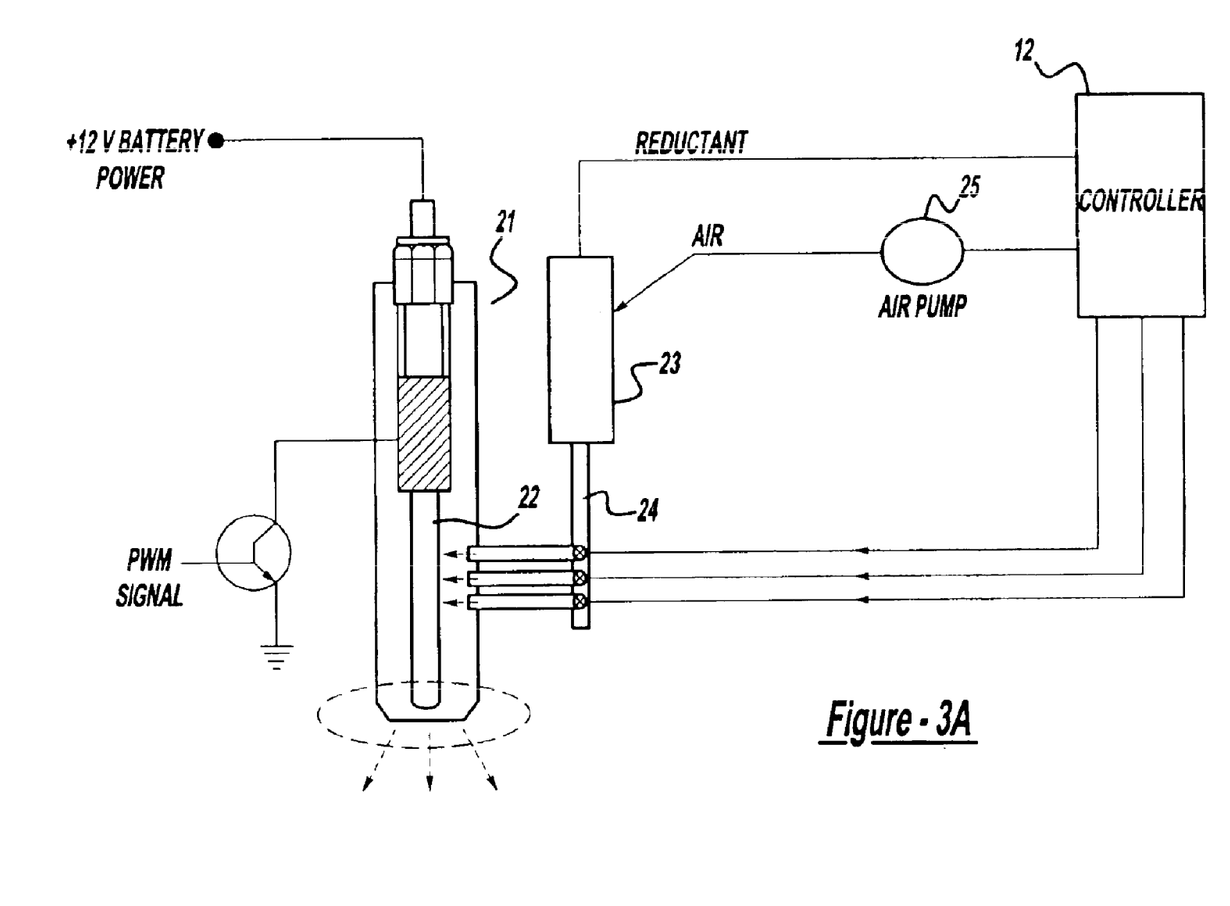
FIGS. 3A–C are diagrams of an example of a reductant delivery system in accordance with the present invention.

FIG. 3A generally represents an example of a reductant delivery system to be employed in the present invention to supply reductant to the SCR catalyst. The system comprises an evaporator unit 21 housing an elongated heating element 22. In this example, the heating element is an electrically heated cylindrically shaped heating element. Alternatively, the heating element could be rectangular shaped to increase its surface contact area with the injected reductant and air mixture. In yet another alternative embodiment (not shown), a hydrolyzing catalytic coating could be added to the evaporator unit, such as for example, a coating on the inner surface of the heating element housing, or a catalytic cap at the point where the evaporated reductant and air mixture enters the exhaust gas manifold. The close proximity of the hydrolyzing catalyst serves to increase overall $NH_3$ production by converting HNCO to $NH_3$. Controller 12 controls the temperature of the heating element by providing a PWM signal of varying duty cycles. The duty cycle of the PWM control signal to the heating element is determined from a prestored table based on operating conditions to achieve desired heating element temperature to optimally vaporize/ decompose the injected urea. Mixing unit 23 has a reductant inlet and an air inlet and an outlet 24 coupled to the evaporator unit 21 through which a mixture of reductant and air is injected into the housing and subsequently comes into contact with the surface of the heating element 22. In an alternative embodiment (not shown), both air and reductant can be injected through a single input. The reductant is metered out by a pump through a control valve, where both the pump and the valve are controlled by controller 12. Air pump 25 supplies pressurized air to the mixing unit 23 thereby creating a mixture of reductant and air. Outlet 24 is configured to deliver the reductant and air mixture to more than one area on the surface of the heating element. Controller 12 can selectively enable and disable injection of the mixture to these areas depending on operating conditions, such as engine speed, load, exhaust gas temperature, etc. For example, when the amount of reductant required is high, such as at high load conditions, it may be necessary to enable delivery of the reductant and air mixture to more than one area on the surface of the heating element. Alternatively, outlet 24 may be configured to deliver the reductant and air mixture to a specific area on the surface of the heating element.

Figure 3B:
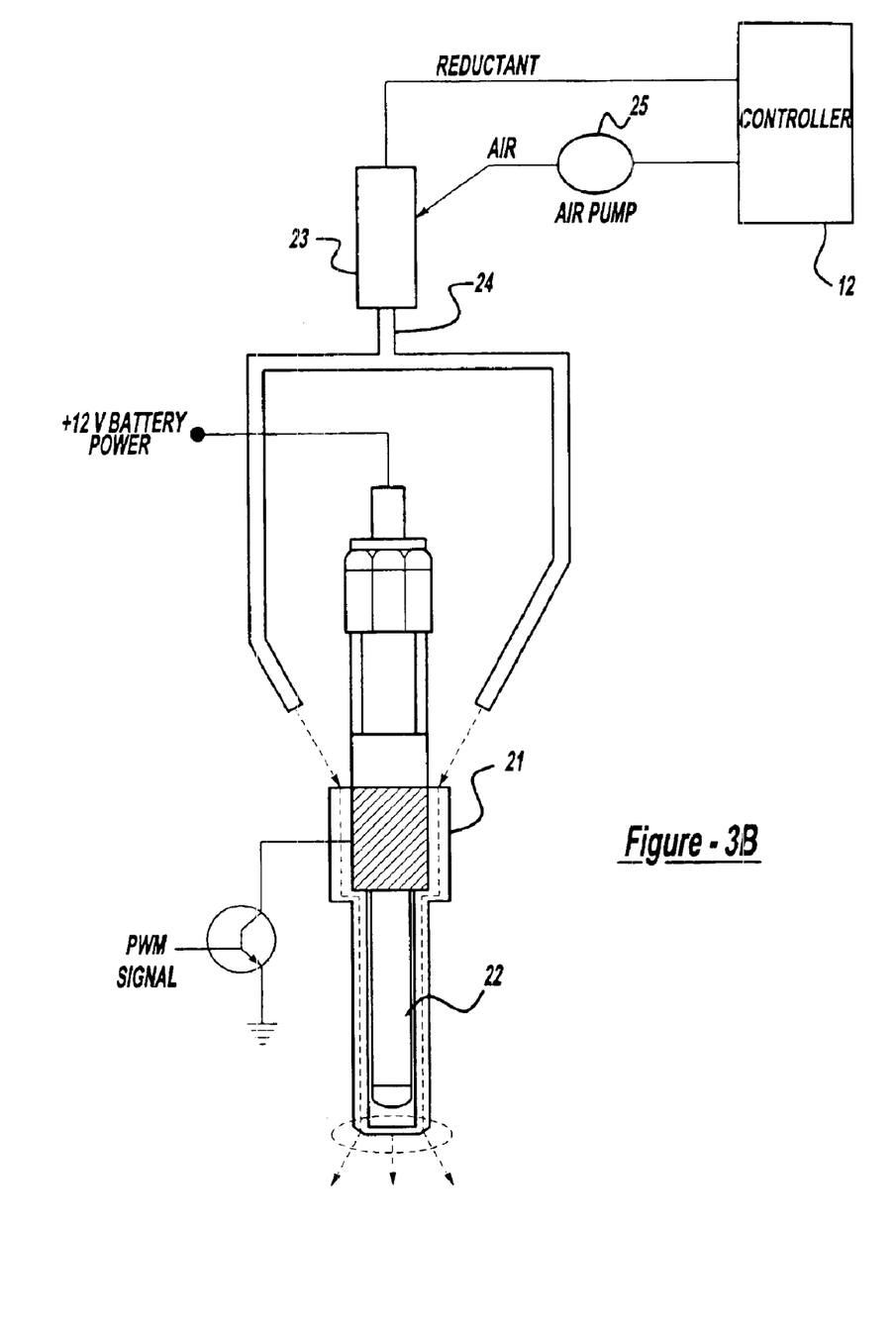

FIG. 3B shows an alternate design for the heating element housing. The heating element is surrounded by a delivery tube the inner diameter of which is wide enough to allow the heating element to be housed. The delivery tube has a narrow channel drilled into it, which serves as a passage for the air and reductant mixture. The air and reductant mixture is injected into the narrow channel and is rapidly vaporized by the heat provided by the enclosed heating element without coming into direct contact with its surface. In this embodiment, the durability of the heating element is further improved since the reductant and air mixture never comes into direct contact its surface, and thus lacquering and soot settlement does not occur. The delivery tube has one or more holes at its tip through which the vaporized reductant and air mixture enters the exhaust gas manifold.

Figure 3C:
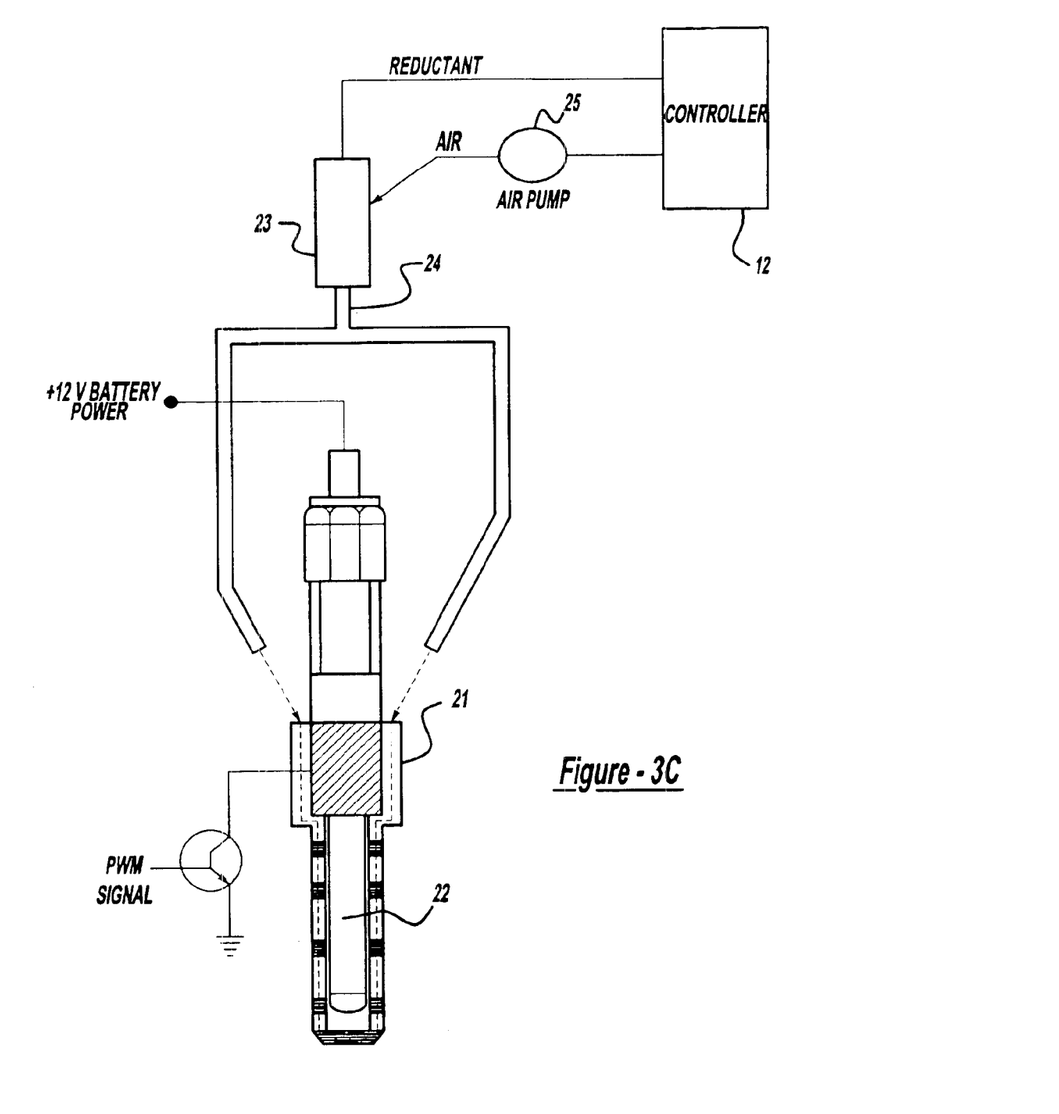

FIG. 3C shows yet another alternative embodiment of the heating element housing shown in FIG. 3B wherein a porous hydrolyzing catalytic plug is placed at the tip of the delivery tube and one or more ports are drilled into the delivery tube along its length and plugged up with porous hydrolyzing catalytic material to facilitate $NH_3$ production.

Figure 4:
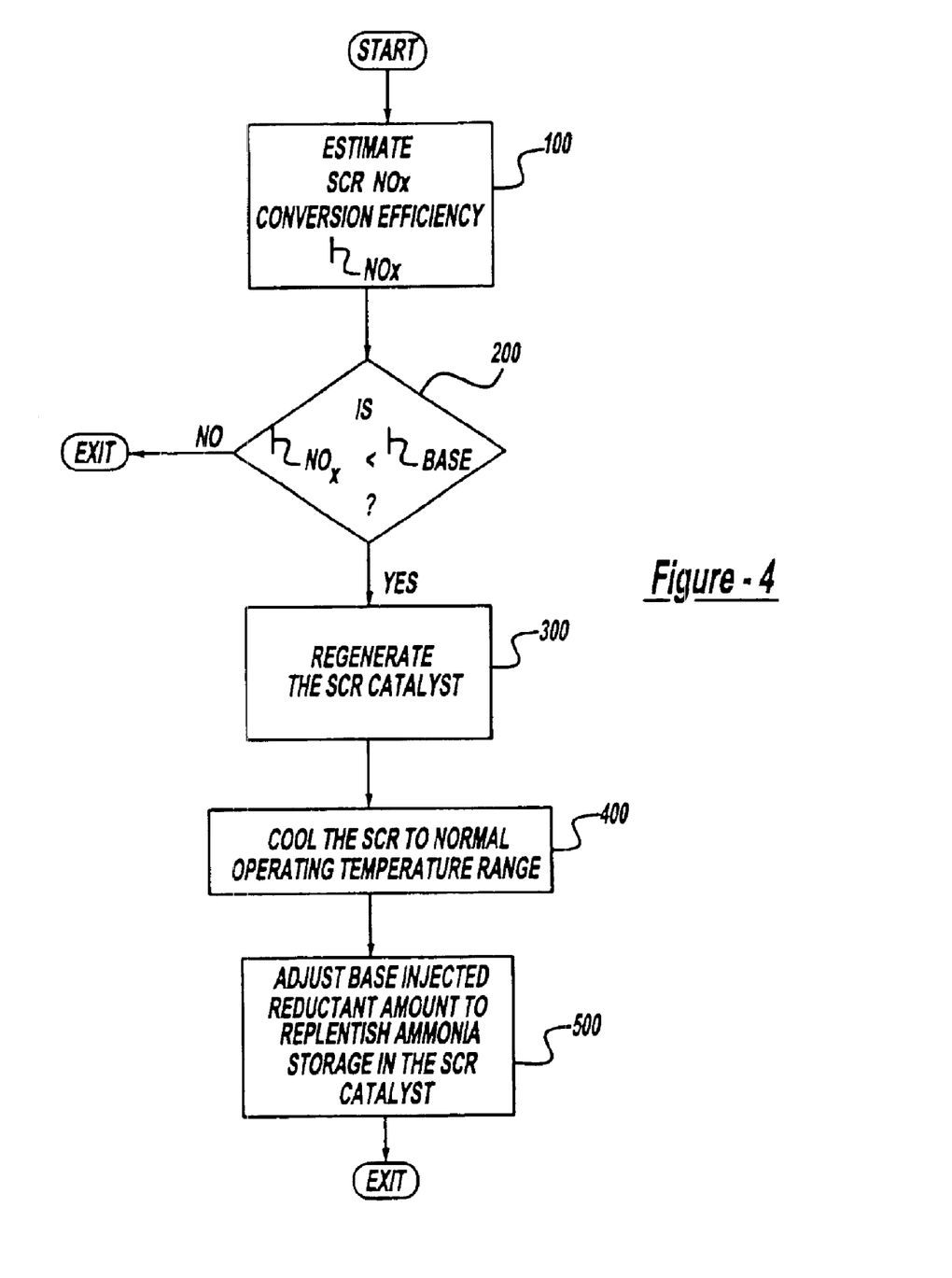
FIG. 4 is a high level flowchart of an exemplary embodiment of the present invention.

Referring now to FIG. 4, an exemplary routine for SCR catalyst regeneration in accordance with the present invention is presented. As will be appreciated by one of ordinary skill in the art, the routine may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

First, in step 100, the catalyst NOx conversion efficiency, is estimated according to the following equation:

$$\eta_{NOx} = \frac{NOx_1 - NOx_2}{NOx_1}$$

Next, in step 200, $\eta_{NO}$, is compared to a base conversion efficiency, $\eta_{base}$, to determine whether the SCR catalyst performance is degraded. In an alternative embodiment, SCR regeneration decision can be made based on a number of miles driven, number of cold starts or a total estimated amount of HC in the feedgas to the SCR catalyst since last regeneration, thus eliminating the need for the NOx sensors upstream and downstream of the SCR catalyst. If the answer to step 200 is NO, the catalyst performance is not degraded, and the routine exits. If the answer to step 200 is YES, i.e., catalyst performance is degraded, the routine proceeds to step 300 wherein the temperature of the SCR is raised above a regeneration temperature, $T_{reg}$. The regeneration temperature may be set to the boiling point of hydrocarbons, or to the temperature at which soot is oxidized by reacting with NOx or oxygen in the exhaust gas mixture entering the SCR catalyst. The increase in temperature can be accomplished, for example, by creating an exothermic reaction in the oxidation catalyst through injection of a predetermined amount of hydrocarbons, or by engine related measures, such as retardation of injection timing, increasing EGR, closing an intake throttle, or by means of an electrical heater. The total amount of reductant and the duration of injection required to raise the SCR catalyst temperature to the required temperature and to maintain it at that temperature for a sufficient amount of time to complete regeneration may be determined from a prestored map based on engine operating conditions, such as engine speed, load, catalyst temperature, exhaust gas temperature, coolant temperature, or any other factor known to those skilled in the art to affect the amount of hydrocarbons required to create desired exotherm for a desired length of time. While the SCR regeneration is in process, the amount of reductant injected into the SCR during normal operation is adjusted because less storage of ammonia occurs in the SCR catalyst at the regeneration temperatures. Once regeneration is completed, the routine proceeds to step 400 wherein the SCR catalyst is cooled to a normal operating temperature range by, for example, lowering or discontinuing hydrocarbon injection into the oxidation catalyst, or by varying engine parameters, such as advancing injection timing. Next, in step 500, the amount of reductant injected into the SCR catalyst is adjusted to replenish the ammonia released from the SCR catalyst storage sites due to regeneration. Engine operating conditions, such as, for example, speed, load, catalyst temperature, mass airflow, etc., are evaluated to determine an additional amount of ammonia to be injected into the SCR catalyst over the initial amount of ammonia required to continuously reduce NOx in the SCR. In an alternative embodiment, ammonia injection amount can be continuously adjusted as a function of SCR temperature, such that less or no ammonia is injected at regeneration temperatures and the amount of injection progressively increases as the temperature of the catalyst cools down following regeneration. In this way, as the hydrocarbons and soot are desorbed from the SCR catalyst storage sites by the regeneration process, the continuous injection ensures ammonia storage on those sites thus optimizing the SCR NOx conversion efficiency. The change in the amount of ammonia injected as the catalyst temperature is changing is governed by catalyst chemistry as well as engine operating parameters and may be determined from a calibratable table.

Therefore, according to the present invention, it is possible to improve NOx conversion efficiency of an SCR catalyst by removing stored contaminants, such as hydrocarbons and soot, from its storage sites. This can be accomplished by a regeneration process wherein the temperature of the catalyst is maintained above a predetermined temperature for a sufficient amount of time to boil off adsorbed hydrocarbons and remove soot deposits. In addition, over-injection of ammonia to replenish stored ammonia that was released from the catalyst during the regeneration process further improves the SCR catalyst's NOx conversion efficiency.

This concludes the description of the invention. The reading of it by those skilled in the art would bring to mind many alterations and modifications without departing from the spirit and the scope of the invention. Accordingly, it is intended that the scope of the invention is defined by the following claims:

What is claimed is:

1. A method for controlling an exhaust gas aftertreatment device coupled downstream of a lean burning internal combustion engine, comprising:
    a first mode of operation wherein the device is operated at a temperature above a first temperature for a predetermined interval to regenerate the device, wherein said first temperature is a boiling temperature of hydrocarbons; and
    a second mode of operation wherein the device is operated at a temperature below said first temperature and reductant is added to an exhaust gas mixture entering the device to compensate for reductant released from the device during said regeneration.

2. The method as set forth in claim 1 wherein said reductant is ammonia.

3. The method as set forth in claim 1 wherein the exhaust gas aftertreatment device is an SCR catalyst.

4. The method as set forth in claim 3 wherein the engine is a diesel engine.

5. The method as set forth in claim 1 wherein said interval is a time interval.

6. The method as set forth in claim 5 wherein said time interval is approximately 60 seconds.

7. A method for controlling an exhaust gas aftertreatment device coupled downstream of an internal combustion engine, comprising:
    providing an indication that the device performance is degraded;
    in response to said indication, regenerating the device by maintaining the device's temperature above a predetermined temperature for a predetermined interval; and
    injecting a predetermined amount of reductant into the device thereby causing reductant storage in the device, where said indication of degraded performance is provided based on a total estimated amount of an exhaust gas constituent entering the device since a last regeneration event and where said exhaust gas constituent is one of hydrocarbon and NOx.

8. The method as set forth in claim 7 wherein the engine is a diesel engine.

9. The method as set forth in claim 7 wherein the exhaust gas aftertreatment device is an SCR catalyst.

10. The method as set forth in claim 7 wherein said indication of degraded performance is based on a signal from a NOx sensor coupled downstream of the device.

11. The method as set forth in claim 7 wherein said indication of degraded performance is based on a total distance driven by the vehicle.

12. The method as set forth in claim 7 wherein said indication of degraded performance is based on a number of vehicle cold starts since last device regeneration event.

13. The method as set forth in claim 7 wherein said predetermined temperature is a boiling temperature of hydrocarbons.

14. The method as set forth in claim 7 wherein said temperature is a temperature at which soot reacts with NOx.

15. The method as set forth in claim 7 wherein said temperature is a temperature at which soot reacts with oxygen.

16. The method as set forth in claim 7 wherein said reductant is ammonia.

17. A method for controlling an exhaust gas aftertreatment device coupled downstream of a lean burning internal combustion engine, comprising:
    a first mode of operation wherein the device is operated at a temperature above a first temperature for a predetermined interval to regenerate the device, wherein said first temperature is a boiling temperature of hydrocarbons, wherein said first temperature is a temperature at which soot reacts with NOx; and
    a second mode of operation wherein the device is operated at a temperature below said first temperature and reductant is added to an exhaust gas mixture entering the device to compensate for reductant released from the device during said regeneration.

18. A method for controlling an exhaust gas aftertreatment device coupled downstream of a lean burning internal combustion engine, comprising:
    a first mode of operation wherein the device is operated at a temperature above a first temperature for a predetermined interval to regenerate the device, wherein said first temperature is a boiling temperature of hydrocarbons, wherein said first temperature is a temperature at which soot reacts with oxygen; and
    a second mode of operation wherein the device is operated at a temperature below said first temperature and reductant is added to an exhaust gas mixture entering the device to compensate for reductant released from the device during said regeneration.

* * * * *